United States Patent Office 3,013,983
Patented Dec. 19, 1961

---

3,013,983
CADMIUM-LOADED MOLECULAR SIEVE
Donald W. Breck, Tonawanda, and Robert M. Milton, White Plains, N.Y., assignors to Union Carbide Corporation, a corporation of New York
No Drawing. Filed Sept. 24, 1958, Ser. No. 762,953
4 Claims. (Cl. 252—455)

This invention relates to zeolitic molecular sieves containing cadmium and/or cadmium oxides which are suitable for use as improved catalysts.

Cadmium has been employed as a catalyst for the decomposition of ethanol into acetaldehyde and ethylene. Cadmium oxide is well known as a catalyst for the dehydrogenation of primary alcohols without substantial dehydration of the alcohol occurring. It would be desirable to provide these catalysts in a form having a very high metal or metal oxide surface as an integral part of a specific support material.

It is an object of this invention to provide a new composition of matter which is a superior catalyst.

Other objects will be apparent from the subsequent disclosure and appended claims.

The composition of matter which satisfies the objects of the present invention comprises a zeolitic molecular sieve containing a substantial quantity of at least one material selected from the group consisting of cadmium and oxides thereof in the internal adsorption area of the zeolitic molecular sieve. This composition of matter contains the metal in a form having a high specific surface which is suitable for chemisorption and catalysis.

Zeolitic molecular sieves, both natural and synthetic, are metal aluminosilicates. The crystalline structure of these materials is such that a relatively large adsorption area is present inside each crystal. Access to this area may be had by way of openings, or pores, in the crystal. Molecules are selectively adsorbed by molecular sieves on the basis of their size and polarity, among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied will be available for adsorption of molecules having a size, shape, and energy which permits entry of the adsorbate molecules into the pores of the molecular sieves.

The zeolitic molecular sieves to be useful in the present invention, must be capable of adsorbing oxygen molecules at the normal boiling point of oxygen. Included among these are the preferred natural zeolitic molecular sieves, chabazite, faujasite, erionite, mordenite, gmelinite, and the calcium form of analcite, and the preferred synthetic zeolitic molecular sieves, zeolite A, D, L, R, S, T, X and Y. The natural materials are adequately described in the chemical art. The characteristics of the synthetic materials and processes for making them are provided below.

The general formula for zeolite X, expressed in terms of mol fractions of oxides, is as follows:

$$0.9 \pm 0.2 M_{\frac{2}{n}} O : Al_2O_3 : 2.5 \pm 0.5 SiO_2 : 0 \text{ to } 8H_2O$$

In the formula "M" represents a cation, for example hydrogen or a meal, and "n" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented in the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9 Na_2O : Al_2O_3 : 2.5 SiO_2 : 6.1 H_2O$$

The major lines in the X-ray diffraction pattern of zeolite X are set forth in Table A below:

TABLE A

| d Value of Reflection in A | $100 I/I_0$ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the KoC doublet of copper, and a Geiger counter spectrometer with a strip chart pen recorder was used. The peak heights, I, and the positions as a function of 2θ, where θ is the Bragg angle, were read from the spectrometer charge. From these, the relative intensities, $$\frac{100I}{I_0}$$

where $I_0$ is the intensity of the strongest line or peak, and d (obs), the interplanar spacing in A, corresponding to the recorded lines were calculated. The X-ray patterns indicate a cubic unit cell of dimensions between 24.5 A. and 25.5 A.

To make sodium zeolite X, reactants are mixed in aqueous solution and held at about 100° C. until the crystals of zeolite X are formed. Preferably the reactants should be such that in the solution the following ratios prevail:

$SiO_2/Al_2O_3$ ------------------------------ 3–5
$Na_2O/SiO_2$ ------------------------------ 1.2–1.5
$H_2O/Na_2O$ ------------------------------ 35–60

The general formula for zeolite A, expressed in terms of mol fractions of oxides is as follows:

$$1.0 \pm 0.2 M_{\frac{2}{n}} O : Al_2O_3 : 1.85 \pm 0.5 SiO_2 : yH_2O$$

In the formula, "M" represents a metal and "n" its valence, and "Y" may be any value up to 6. The zeolite is activated, or made capable of adsorbing certain molecules by the removal of water from the crystal, as by heating. Thus the actual number of mols of water present in the crystal will depend upon the degree of dehydration or activation of the crystal.

As in the case of zeolite X, the metal represented in the formula by the letter "M" can be changed by conventional ion-exchange techniques. For purposes of convenience the sodium form of zeolite A, designated sodium zeolite A, is synthesized and other forms obtained by the modification of the sodium zeolite A.

A typical formula for sodium zeolite A is

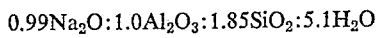
$$0.99Na_2O:1.0Al_2O_3:1.85SiO_2:5.1H_2O$$

The major lines in the X-ray diffraction pattern of zeolite A are set forth in Table B below:

TABLE B

| d Value of Reflection in A | 100 I/I₀ |
|---|---|
| 12.2±0.2 | 100 |
| 8.6±0.2 | 69 |
| 7.05±0.15 | 35 |
| 4.07±0.08 | 36 |
| 3.68±0.07 | 53 |
| 3.38±0.06 | 16 |
| 3.26±0.05 | 47 |
| 2.96±0.05 | 55 |
| 2.73±0.05 | 12 |
| 2.60±0.05 | 22 |

The same procedures and techniques were employed in obtaining the patterns described in Tables A and B.

To make sodium zeolite A, reactants are mixed in aqueous solution and heated at about 100° C. until the crystals of zeolite A are formed. Preferably the reactants should be such that in the solution the following ratios prevail:

$SiO_2/Al_2O_3$ --------- 0.5–1.3
$Na_2O/SiO_2$ --------- 1.0–3.0
$H_2O/Na_2O$ --------- 35–200

The chemical formula for zeolite Y expressed in terms of oxides mole ratios may be written as $$0.9 \pm 0.2 Na_2O : Al_2O_3 : W SiO_2 : X H_2O$$

wherein "W" is a value greater than 3 up to about 5 and "X" may be a value up to about 9.

Zeolite Y has a characteristic X-ray powder diffraction pattern which may be employed to identify zeolite Y. The X-ray powder diffraction data are shown in Table C. The values for the interplanar spacing, d, are expressed in angstrom units. The relative intensity of the lines of the X-ray powder diffraction data are expressed as VS, very strong; S, strong; M, medium; W, weak; and VW, very weak.

TABLE C

| hkl | h²+k²+l² | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole-ratios, which falls within one of the following ranges:

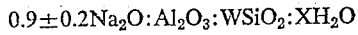

|  | Range 1 | Range 2 | Range 3 |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole ratios, falling within one of the following ranges:

|  | Range 1 | Range 2 | Range 3 |
|---|---|---|---|
| $Na_2O/SiO_2$ | 0.6 to 1.0 | 1.5 to 1.7 | 1.9 to 21 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mole ratios of oxides, may be represented as follows:

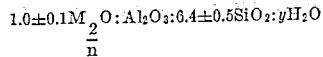
$$1.0 \pm 0.1 M_{\frac{2}{n}} O : Al_2O_3 : 6.4 \pm 0.5 SiO_2 : y H_2O$$

wherein "M" designates a metal, "n" represents the valence of "M"; and "y" may be any value from 0 to about 7.

The more significant d (A.) values, i.e., interplanar spacings, for the major lines in the X-ray diffraction pattern of zeolite L, are given below in Table D.

TABLE D

| | |
|---|---|
| 16.1 ±0.3 | 3.17±0.01 |
| 7.52±0.04 | 3.07±0.01 |
| 6.00±0.02 | 2.91±0.01 |
| 4.57±0.03 | 2.65±0.01 |
| 4.35±0.04 | 2.46±0.01 |
| 3.91±0.02 | 2.42±0.01 |
| 3.47±0.02 | 2.19±0.01 |
| 3.28±0.02 | |

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ —— From about 0.33 to about 1.
$(K_2O+Na_2O)/SiO_2$ —— From about 0.4 to about 0.5.
$SiO_2/Al_2O_3$ —— From about 15 to about 28.
$H_2O/(K_2O+Na_2O)$ —— From about 15 to about 41.

maintaining the mixture at a temperature of about 100° C. until crystallization occurs, and separating the crystals from the mother liquor.

The chemical formula for zeolite D may be written, in terms of oxides, as follows:

$$0.9\pm 0.2[xNa_2O:(1-x)K_2O]:Al_2O_3:wSiO_2:yH_2O$$

wherein "$x$" is a value from 0 to 1, "$w$" is from about 4.5 to about 4.9, and "$y$," in the fully hydrated form, is about 7. In the preferred form of zeolite D, "$x$" is in the range of from 0.4 to 0.6.

Zeolite D has an X-ray powder diffraction pattern substantially like that shown in Table E.

TABLE E

*X-ray diffraction patterns of zeolite D*

[$d$=interplanar spacing in A.: I/I max.=relative intensity]

| Zeolite D | |
|---|---|
| $d$, A. | I/I max. |
| 9.42 | 66 |
| 6.89 | 67 |
| 5.54 | 15 |
| 5.03 | 62 |
| 4.33 | 62 |
| 3.98 | 27 |
| 3.89 | 23 |
| 3.60 | 12 |
| 3.45 | 39 |
| 3.19 | 15 |
| 2.94 | 100 |
| 2.69 | 9 |
| 2.61 | 38 |
| 2.30 | 16 |
| 2.09 | 22 |
| 1.81 | 29 |
| 1.73 | 23 |

$$\frac{H_2O}{Na_2O+K_2O}=18 \text{ to } 45$$

The mixture is maintained at a temperature within the range of about 100° C. to 120° C. until crystals are formed; the crystals are then separated from the mother liquor.

The chemical formula for zeolite R may be written as:

$$0.9\pm 0.2Na_2O:Al_2O_3:wSiO_2:xH_2O$$

wherein "$w$" is from 3.45 to 3.65, and "$x$," for the fully hydrated form, is about 7.

Zeolite R has an X-ray powder diffraction pattern substantially like that shown in Table F.

TABLE F

*X-ray diffraction patterns of zeolite R*

[$d$=interplanar spacing in A.: I/I max.=relative intensity]

| Zeolite R | |
|---|---|
| $d$, A. | 100 (I/I max.) |
| 9.51 | 88 |
| 6.97 | 35 |
| 5.75 | 16 |
| 5.61 | 26 |
| 5.10 | 45 |
| 4.75 | 12 |
| 4.37 | 78 |
| 4.13 | 12 |
| 4.02 | 14 |
| 3.92 | 35 |
| 3.80 | 16 |
| 3.63 | 41 |
| 3.48 | 25 |
| 3.34 | 12 |
| 3.21 | 18 |
| 3.13 | 12 |
| 2.95 | 100 |
| 3.89 | 16 |
| 2.80 | 14 |
| 2.71 | 14 |
| 2.66 | 10 |
| 2.62 | 25 |
| 2.53 | 22 |
| 2.39 | 10 |
| 2.14 | 6 |
| 2.10 | 14 |
| 1.93 | 10 |
| 1.89 | 10 |
| 1.82 | 18 |
| 1.76 | 6 |
| 1.73 | 16 |
| 1.69 | 4 |

Zeolite R may be prepared as follows:

A sodium aluminosilicate-water mixture is prepared such that the initial composition of the reactant mixture, in terms of oxide-mole-ratios, falls within any one of the following seven ranges:

| | I | II | III | IV | V | VI | VII |
|---|---|---|---|---|---|---|---|
| $Na_2O/SiO_2$ | 0.20 to 0.40 | 0.41 to 0.60 | 0.61 to 0.80 | 0.81 to 1.0 | 0.81 to 1.0 | 1.7 to 1.9 | 1.2 to 1.4 |
| $SiO_2/Al_2O_3$ | about 4 | 3.5 to 6.0 | 3.5 to 6.5 | 3 to 4.5 | about 30 | 10 to 25 | about 6 |
| $H_2O/Na_2O$ | 22 to 60 | 30 to 60 | 40 to 80 | 40 to 80 | 50 to 60 | 60 to 70 | 80 to 90 |

Zeolite D may be prepared as follows:

A sodium-potassium aluminosilicate-water mixture is prepared such that the initial composition of the reactant mixture in terms of oxide-mole-ratios is:

$$\frac{Na_2O+K_2O}{SiO_2}=0.45 \text{ to } 0.65$$

$$\frac{Na_2O}{Na_2O+K_2O}=0.74 \text{ to } 0.92$$

$$\frac{SiO_2}{Al_2O_3}=\text{about } 28$$

The mixture is maintained at a temperature with the range of about 100° C. to 120° C. until crystals are formed; the crystals are then separated from the mother liquor.

The chemical formula for zeolite S may be written as:

$$0.9\pm 0.2Na_2O:Al_2O_3:wSiO_2:xH_2O$$

wherein "$w$" is from 4.6 to 5.9 and "$x$," for the fully hydrated form, is from about 6 to 7.

Zeolite S has a characteristic X-ray powder diffraction pattern which may be employed to identify zeolite S. The X-ray powder diffraction data are shown in Table G.

TABLE G

*X-ray diffraction patterns of synthetic zeolite S*

[d=interplanar spacing in A.; I/I max.=relative intensity]

| d, A. | 100 (I/I max.) |
|---|---|
| 11.88 | 77 |
| 7.73 | 19 |
| 7.16 | 100 |
| 5.96 | 9 |
| 5.03 | 72 |
| 4.50 | 46 |
| 4.12 | 79 |
| 3.97 | 20 |
| 3.44 | 62 |
| 3.305 | 13 |
| 3.236 | 23 |
| 2.973 | 80 |
| 2.858 | 47 |
| 2.693 | 19 |
| 2.603 | 30 |
| 2.126 | 11 |
| 2.039 | 39 |
| 1.910 | 12 |
| 1.809 | 40 |
| 1.722 | 32 |

Zeolite S may be prepared by preparing a sodium aluminosilicate-water mixture such that the composition of the reactant mixture, in terms of oxide-mole ratios, falls within the following range when the source of silica is an aqueous colloidal silica sol:

| | |
|---|---|
| $Na_2O/SiO_2$ | 0.3 to 0.6 |
| $SiO_2/Al_2O_3$ | 6 to 10 |
| $H_2O/Na_2O$ | 20 to 100 | and falls within the following range when the source of silica is sodium silicate:

| | |
|---|---|
| $Na_2O/SiO_2$ | about 0.5 |
| $SiO_2/Al_2O_3$ | about 25 |
| $H_2O/Na_2O$ | about 18 | maintaining the mixture at a temperature in the range of from about 80° C. up to about 120° C., preferably at about 100° C., and at a pressure at least equal to the vapor pressure of water in equilibrium with the mixture of reactants until crystals are formed, and separating the crystals from the mother liquor.

The chemical formula for zeolite T may be written, in terms of mole ratios of oxides, as follows:

$$1.1\pm0.4[xNa_2O:(1-x)K_2O]:Al_2O_3:6.9\pm0.5SiO_2:yH_2O$$

wherein "x" may be any value from about 0.1 to about 0.8, and "y" may be any value from about 0 to about 8. Zeolite T may be identified and distinguished from other zeolites, and other crystalline substances, by its X-ray powder diffraction pattern. The data which are set forth below in Table H are for a typical example of zeolite T.

TABLE H

| Bragg Angle, 2θ | Interplanar Spacing, d (A.) | Relative Intensity, 100 I/I₀ |
|---|---|---|
| 7.72 | 11.45 | 100 |
| 9.63 | 9.18 | 4 |
| 11.74 | 7.54 | 13 |
| 13.35 | 6.63 | 54 |
| 14.74 | 6.01 | 2 |
| 15.44 | 5.74 | 6 |
| 17.78 | 4.99 | 2 |
| 19.43 | 4.57 | 8 |
| 20.46 | 4.34 | 45 |
| 21.35 | 4.16 | 3 |
| 21.78 | 4.08 | 2 |
| 23.27 | 3.82 | 16 |
| 23.64 | 3.76 | 56 |
| 24.28 | 3.67 | 1 |
| 24.82 | 3.59 | 30 |
| 26.04 | 3.42 | 2 |
| 26.92 | 3.31 | 16 |
| 28.04 | 3.18 | 12 |
| 28.29 | 3.15 | 18 |
| 30.47 | 2.93 | 11 |
| 31.15 | 2.87 | 38 |
| 31.38 | 2.85 | 45 |
| 33.41 | 2.68 | 11 |
| 34.32 | 2.61 | 2 |
| 35.83 | 2.51 | 8 |
| 36.09 | 2.49 | 13 |
| 39.26 | 2.30 | 2 |
| 40.81 | 2.21 | 6 |
| 42.61 | 2.12 | 5 |
| 43.33 | 2.09 | 3 |
| 45.58 | 1.99 | 2 |
| 46.30 | 1.96 | 2 |
| 48.17 | 1.89 | 8 |
| 48.84 | 1.86 | 2 |
| 49.61 | 1.84 | 4 |
| 51.44 | 1.78 | 8 |
| 51.58 | 1.77 | 5 |
| 52.29 | 1.75 | 2 |
| 53.68 | 1.71 | 3 |
| 55.40 | 1.66 | 9 |
| 58.03 | 1.59 | 5 |
| 60.82 | 1.52 | 1 |
| 61.48 | 1.51 | 2 |
| 63.29 | 1.47 | 3 |
| 66.24 | 1.41 | 1 |
| 67.65 | 1.38 | 3 |

Zeolite T may be prepared by preparing an aqueous sodium-potassium aluminosilicate mixture having a composition, expressed in terms of mole ratios of oxides, falling within the following range:

| | |
|---|---|
| $Na_2O/(Na_2O+K_2O)$ | From about 0.7 to about 0.8. |
| $(Na_2O+K_2O)/SiO_2$ | From about 0.4 to about 0.5. |
| $SiO_2/Al_2O_3$ | About 20 to 28. |
| $H_2O/(Na_2O+K_2O)$ | About 40 to 42. | maintaining the mixture at a temperature of about 100° C. until crystallization occurs, and separating the crystals from the mother liquor.

The cadmium may be introduced into the inner adsorption area of the zeolitic molecular sieve with an aqueous solution of a water-soluble salt of cadmium to be deposited in the inner adsorption area of the zeolitic molecular sieve whereby ion-exchange of the metal cations of the zeolitic molecular sieve occurs; separating the zeolitic molecular sieve from the aqueous exchanging solution; drying the zeolitic molecular sieve whereby substantially all of the water is removed from the zeolitic molecular sieve; and intimately contacting the zeolitic molecular sieve with a reducing metal such as alkali metal vapors or gaseous hydrogen whereby the cadmium cations are reduced to elemental metal.

In an example of the invention a solution of cadmium nitrate was prepared by dissolving 80 grams of $Cd(NO_3)_2\cdot 4H_2O$ in one liter of distilled water. This solution was mixed with 100 grams of zeolite X and allowed to stand for 2¼ hours. The zeolite was then filtered and dried at 100° C. for two hours.

The cadmium-exchanged zeolite containing 17.9 weight-percent cadmium was placed in a horizontal tube furnace and heated at 90–230° C. for two hours under 2–3 cubic feet per hour hydrogen. The bed color changed from white to yellow. Chemical analysis of the zeolite product indicated that it contained 16.6 weight-percent cadmium. On further heating at temperature up to 500° C. for 5½ hours some of the cadmium metal was distilled out. The zeolite color turned to white, and the cadmium content dropped to 14.8 percent.

In the utilization of cadmium and cadmium oxides for catalytic purposes they have often been supported by alumina, silica, mixtures thereof and aluminosilicates. However, when contained in the inner adsorption area of molecular sieves as in the present application they provide superior catalysts because the products contain the metal in the finest possible distribution, the metal being in a highly active form. The molecular sieves have a higher surface area than any of the carrier supports. The uniform structure of the molecular sieves provide uniform activity throughout the entire catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in many cases exclude the interfering catalysts from the catalytic surface while in no way preventing the desired materials from contacting this surface. Further the chemical and catalytic nature of the molecular sieve itself may be altered to suit the requirements of the reactants by the selection of the most suitable cation present in the molecular sieve structure.

It is a simple matter to obtain cadmium oxide-loaded molecular sieves from the cadmium-loaded molecular sieves by standard oxidation procedures. Exposure of the cadmium-loaded molecular sieve to oxygen at an elevated temperature is quite satisfactory. However, the temperature should not exceed the temperature at which the crystal structure of the zeolitic molecular sieve will be destroyed.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The product of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite A is described and claimed in U.S. Patent No. 2,882,243, issued April 14, 1959, to R. M. Milton.

Zeolite D is described and claimed in U.S. patent application Serial No. 680,383, filed August 26, 1957.

Zeolite L is described and claimed in U.S. patent application Serial No. 711,565, filed January 28, 1958.

Zeolite R is described and claimed in U.S. patent application Serial No. 680,381, filed August 26, 1957.

Zeolite S is described and claimed in U.S. patent application Serial No. 724,843, filed March 31, 1958.

Zeolite T is described and claimed in U.S. patent application Serial No. 733,819, filed May 8, 1958, now U.S. Patent No. 2,950,952.

Zeolite X is described and claimed in U.S. Patent No. 2,882,244 issued April 14, 1959 to R. M. Milton.

Zeolite Y is described and claimed in U.S. patent application Serial No. 728,057, filed April 14, 1958.

The preferred compositions of matter for the present invention which have been found to be most satisfactory and useful for catalytic purposes are the metal-loaded zeolites A, X, Y, and faujasite.

Erionite is a naturally occurring zeolite, described originally by Eakle, Am. J. Science (4), 6, 66 (1898). It is most readily identified by its characteristic X-ray powder diffraction pattern. The $d$-spacings, in A., and relative intensities thereof, obtained on a well-crystallized specimen are tabulated below.

*X-ray powder data, erionite*

| $d$-spacing, A. | Relative Intensity, $I/I_0 \times 100$ |
|---|---|
| 11.38 | 100 |
| 9.06 | 10 |
| 7.50 | 10 |
| 6.56 | 40 |
| 6.24 | 10 |
| 5.68 | 10 |
| 5.34 | 10 |
| 4.56 | 10 |
| 4.31 | 40 |
| 4.15 | 20 |
| 3.80 | 20 |
| 3.74 | 40 |
| 3.58 | 30 |
| 3.30 | 10 |
| 3.27 | 10 |
| 3.20 | 10 |
| 3.16 | 10 |
| 3.14 | 10 |
| 3.00 | 5 |
| 2.92 | 5 |
| 2.86 | 30 |
| 2.83 | 30 |
| 2.805 | 20 |
| 2.67 | 10 |
| 2.59 | 5 |
| 2.49 | 10 |
| 2.47 | 10 |
| 2.20 | 5 |
| 2.11 | 5 |
| 1.88 | 5 |
| 1.83 | 5 |
| 1.77 | 10 |
| 1.65 | 10 |

What is claimed is:

1. As a new composition of matter a dehydrated rigid three-dimensional crystalline metal aluminosilicate zeolite of the molecular sieve type capable of adsorbing oxygen internally at the normal boiling point of oxygen containing at least one material selected from the group consisting of elemental cadmium and oxides thereof in the inner adsorption region of said crystalline metal aluminosilicate zeolite.

2. As a new composition of matter a dehydrated rigid three-dimensional crystalline metal aluminosilicate zeolite of the molecular sieve type chosen from the group consisting of zeolite A, zeolite D, zeolite L, zeolite R, zeolite S, zeolite T, zeolite X, zeolite Y, chabazite, faujasite, erionite, mordenite, gmelinite, and the calcium form of analcite containing at least one material selected from the group consisting of elemental cadmium and oxides thereof in the inner adsorption region of said crystalline metal aluminosilicate zeolite.

3. A composition of matter as described in claim 2 wherein the crystalline metal aluminosilicate zeolite of the molecular sieve type is zeolite A.

4. A composition of matter as described in claim 2 wherein the crystalline metal aluminosilicate zeolite of the molecular sieve type is zeolite X.

References Cited in the file of this patent

UNITED STATES PATENTS

| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,882,243 | Milton | Apr. 14, 1959 |
| 2,882,244 | Milton | Apr. 14, 1959 |

OTHER REFERENCES

Breck et al.: "Crystalline Zeolites," J.A.C.S., vol. 78, No. 23, p. 5968, December 8, 1956.

UNITED STATES PATENT OFFICE
CERTIFICATE OF CORRECTION

Patent No. 3,013,983                         December 19, 1961

Donald W. Breck et al.

It is hereby certified that error appears in the above numbered patent requiring correction and that the said Letters Patent should read as corrected below.

Column 8, line 36, after "sieve" insert -- by intimately contacting the zeolitic molecular sieve --.

Signed and sealed this 9th day of October 1962.

(SEAL)
Attest:

ERNEST W. SWIDER
Attesting Officer

DAVID L. LADD
Commissioner of Patents